(12) United States Patent
Chung et al.

(10) Patent No.: US 7,433,795 B2
(45) Date of Patent: Oct. 7, 2008

(54) TM METHOD FOR CONTROLLING DYNAMIC APPARATUS AND APPARATUS THEREOF

(75) Inventors: Hakyoung Chung, Seoul (KR); Jinwoo Song, Seoul (KR)

(73) Assignee: Microinfinity, Inc., Seoul (KR)

( * ) Notice: Subject to any disclaimer, the term of this patent is extended or adjusted under 35 U.S.C. 154(b) by 0 days.

(21) Appl. No.: 11/664,539

(22) PCT Filed: Jul. 5, 2005

(86) PCT No.: PCT/KR2005/002132

§ 371 (c)(1),
(2), (4) Date: Apr. 3, 2007

(87) PCT Pub. No.: WO2006/038763

PCT Pub. Date: Apr. 13, 2006

(65) Prior Publication Data

US 2007/0255521 A1    Nov. 1, 2007

(30) Foreign Application Priority Data

Oct. 5, 2004 (KR) .................. 10-2004-0078978

(51) Int. Cl.
*G06F 19/00* (2006.01)
(52) U.S. Cl. ...................................... 702/147; 33/318

(58) Field of Classification Search ............... 702/94, 702/95, 147, 50, 151, 152, 153, 182, 183, 702/184, 185; 33/318–329
See application file for complete search history.

(56) References Cited

U.S. PATENT DOCUMENTS 7,216,055 B1 * 5/2007 Horton et al. ............... 702/153

* cited by examiner

*Primary Examiner*—Edward Raymond
(74) *Attorney, Agent, or Firm*—Nath Law Group; Jerald L. Meyer; Derek Richmond (57) ABSTRACT

Provided is a method and apparatus for controlling the precision of the rotation angle of a rotation of a dynamic apparatus, including the step of determining a conversion factor of a gyroscope installed in the dynamic apparatus to control the rotary movement to be a first conversion factor; a first step of measuring an output angular velocity in the case of applying a predetermined test operation to the gyroscope; a second step of measuring a second conversion factor based on the test operation and the output angular velocity corresponding to the test operation; a third step of computing an error between the first conversion factor and the second conversion factor; and a fourth step of updating the first conversion factor of the gyroscope by the second conversion factor in the case the error is more than a predetermined standard value, wherein in the case the dynamic apparatus is on standby or an operation command with respect to a predetermined operation is inputted, the first through fourth steps are performed before the operation is performed.

13 Claims, 8 Drawing Sheets

| APPLIED VOLTAGE | ANGULAR VELOCITY | CONVERSION FACTOR |
|---|---|---|
| 10 | 30 | 3 |
| 11 | 33 | 3 |
| 12 | 36 | 3 |
| ⋮ | ⋮ | ⋮ |

TM METHOD FOR CONTROLLING DYNAMIC APPARATUS AND APPARATUS THEREOF

TECHNICAL FIELD

The present invention relates to a method and system for controlling the accuracy in rotation angle of a rotation of a dynamic apparatus, and more particularly, to a method and system in which the conversion factor of a gyroscope installed in a dynamic apparatus is measured again and a previous conversion factor is updated whenever a predetermined condition is satisfied such as the dynamic apparatus is on standby, thereby controlling accuracy in rotation angle of the dynamic apparatus.

BACKGROUND ART

Generally, a gyroscope is a sensor measuring angular velocity, which measures the angular velocity of the rotation of an object or a vehicle. In the case of using a gyroscope, only the angular velocity of rotation is substantially used for control, such as an image stabilizer of a camcorder, a three-dimensional mouse, a dynamic controller for an RC helicopter, and an electronic stability program for an automobile.

In the case of using a gyroscope, as described above, many types of errors such as a conversion factor error, a conversion factor nonlinearity, a static bias error, an in-run bias error, a run-to-run bias error, a quantization error, and an unstructured error, noises such as white noise, color noise, dynamic noise, drive noise, and resonance frequency noise, sensitivity such as G sensitivity and $G^2$ sensitivity, and temperature drift such as a conversion factor and bias do not create many problems.

Namely, the various errors are substantially managed in a field requiring a high-accuracy navigation system and are not considered important except for the conversion factor error.

However, currently, a low-priced inertia sensors using microelectric mechanical system (MEMS), whose quality is relatively lower, are becoming commonly used in navigation system such as car navigation and personal navigation in addition to traditional control uses. Therefore, the errors described above start becoming important variables affecting these inertia sensors.

Generally, the navigation system provides information on location recognition such as location, posture, velocity, acceleration, time, angular direction, and angular velocity by using a navigation sensor. Navigation sensors used in conventional navigation systems are generally used in munitions, which are high-priced and have high accuracy. Since the error of the high-priced sensor having high accuracy is kept very small, not much error compensation is required and the effect of error compensation is not relatively large.

However, currently, as MEMS technology becomes more advanced, small and low-priced inertia sensors are developed for civilian use. Though the MEMS type inertia sensor is small and low-priced, it has more various error factors than high-priced sensors, and if the error factors described above can not be adjusted, accuracy of navigation systems can not be obtained. Therefore, error compensation is a very important part of inertia navigation systems using a small/low-priced inertia sensor.

The error factors described above may be largely divided into a deterministic error and a nondeterministic error. The deterministic error related to the present invention is an error whose property is identified for each sensor and can be compensated for in advance by using various error compensation methods. There is a conversion factor error and a static bias error in the deterministic error.

A conversion factor indicates the ratio of an angular velocity according to the output voltage of a gyroscope, and a unit of the conversion factor is deg/sec/V or rad/sec/V. Namely, the conversion factor is a factor converting the value of an angular velocity according to output voltage.

Figure 1:
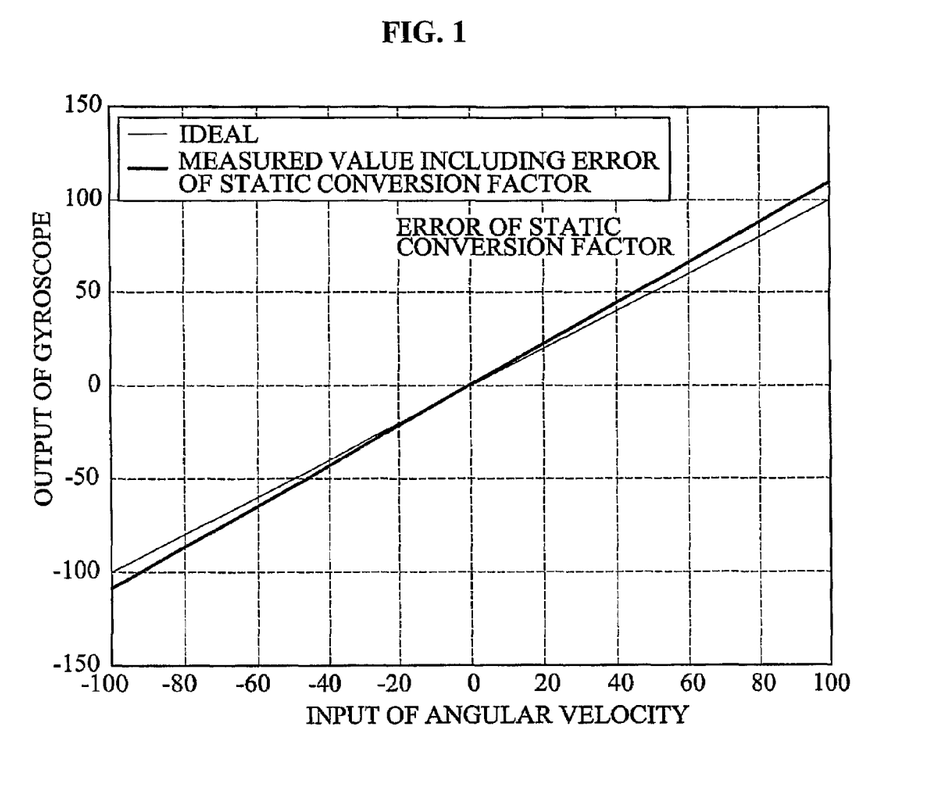
FIG. 1 is a diagram illustrating an example of the linear error of a static conversion factor.

In the conversion factor, a certain error occurs according to a bias voltage or resistance. A corrected conversion factor error indicates a difference between an actual conversion factor and a theoretical conversion factor. A conversion factor error causes all error of degree of angle. In the case of an MEMS sensor, since a conversion factor error is at most 5 to 10% according to sensors, if a conversion factor error according to each sample is not compensated for, a maximum of 5 to 10% of an initial angular error and an accumulated error will occur. As illustrated in FIG. 1, a linear error of the static conversion factor, as described above, is identical with the difference between the gradient of an actually measured value and the gradient of a theoretical value.

Figure 2:
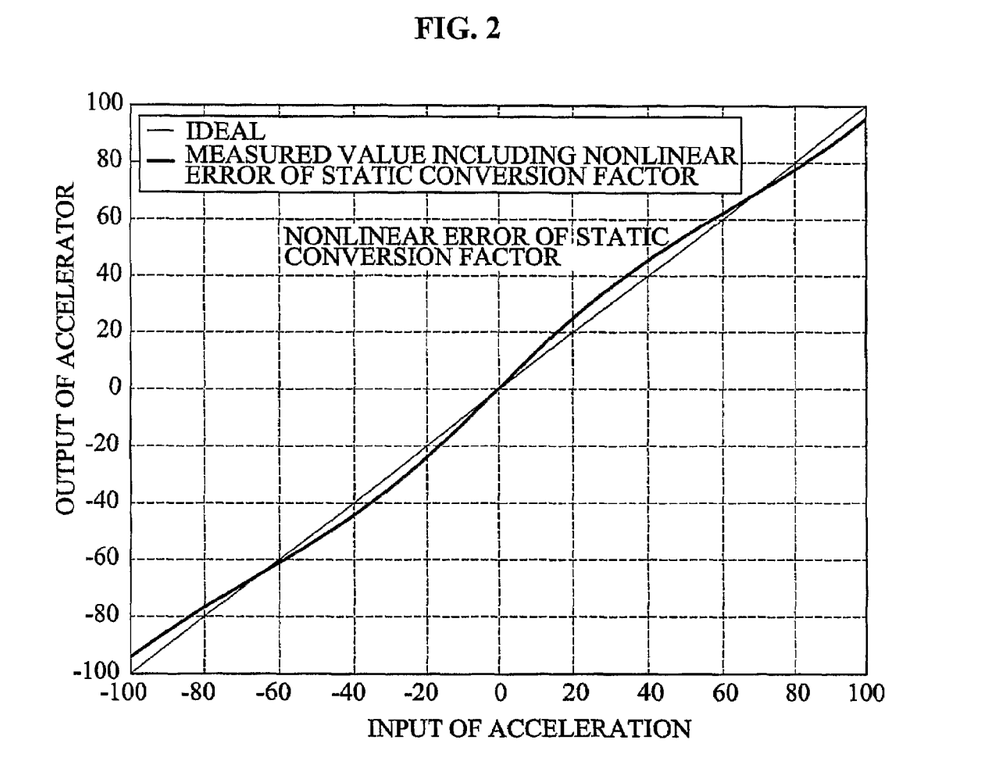
FIG. 2 is a diagram illustrating an example of the nonlinear error of a static conversion factor.

On the other hand, as illustrated in FIG. 2, a nonlinear error of the static conversion factor indicates the change of output according to the size of an input angular velocity. The linear error of the static conversion factor is unrelated to the size of the input angular velocity, as illustrated in FIG. 1, and the nonlinear error of the static conversion factor is an error according to the size of the input, as illustrated in FIG. 2.

In conventional low-priced dynamic apparatuses, many conversion factor errors occur due to the change of a resistance or the influence of bias. Also, conventional low-priced dynamics apparatus have a problem in that an error caused by a change of temperature, the passage of time, or a change in power, may occur. In the case the error is not compensated for, the conversion factor error of the dynamic apparatus increases. However, with conventional methods, a method of compensating the conversion factor of the dynamic apparatus in order to precisely perform a rotation can not be provided.

Figure 3:
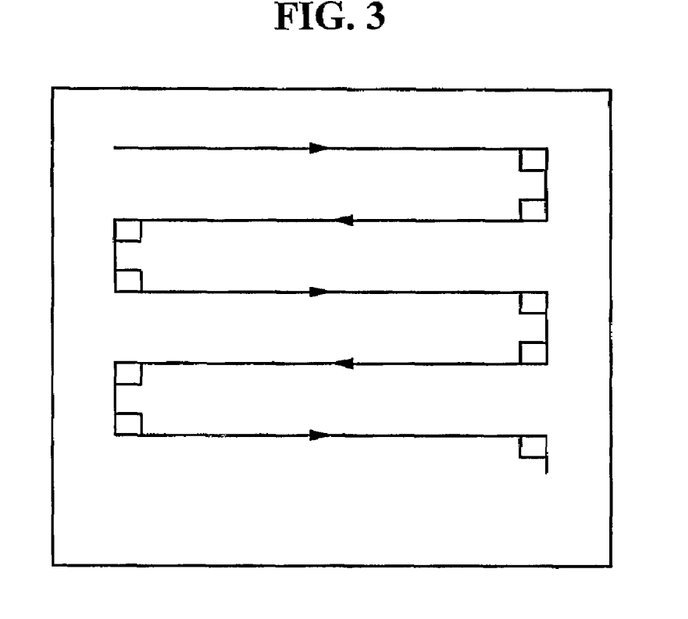
FIG. 3 is a diagram illustrating the track in the case a dynamic apparatus normally operates.
Figure 4:
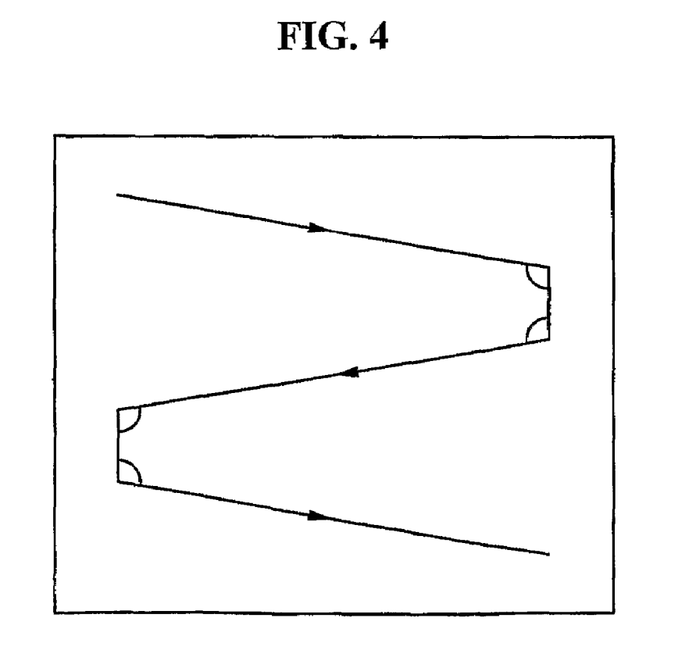
FIG. 4 is a diagram illustrating the track in the case a dynamic apparatus abnormally operates due to an error in a conversion factor.

In FIG. 3, a cleaning robot moves in a route shown in FIG. 3 in order to effectively clean a certain area, using a low-priced dynamic apparatus. However, in the case the cleaning robot is using a conventional low-priced dynamic apparatus, if the error of a conversion factor is more than a predetermined standard value, a rotation angular velocity is not outputted. Accordingly, as illustrated in FIG. 4, the cleaning robot rotates at an angle different from a determined rotation angle, thereby not effectively cleaning the area.

As described above, since the error of a conversion factor is more than a predetermined standard value and the accuracy of a rotation angle is lower, a conventional low-priced dynamic apparatus rotates by a rotation angle more or less than a determined rotation angle, thereby does not perform a precise rotation. Particularly, in the case a conversion factor error is accumulated, the problem will inevitably increase.

DISCLOSURE OF INVENTION

Technical Goals

To solve the problems of conventional methods described above, the present invention provides a method and apparatus for controlling the accuracy of the rotation angle of a rotation of a dynamic apparatus.

The present invention also provides a method and apparatus for testing a conversion factor of a rotation of dynamic apparatus and updating the conversion factor in the case the conversion factor error is more than a predetermined standard value.

The present invention also provides a method and apparatus for controlling a rotating dynamic apparatus to operate with a precise rotation angle by compensating for a linear error of a conversion factor occurring in the dynamic apparatus.

The present invention also provides a method and apparatus for enabling a rotating dynamic apparatus performing precise operations by periodically adjusting a conversion factor while on standby.

The present invention also provides a method and apparatus for controlling an error of the conversion factor of a gyroscope installed in a rotating dynamic apparatus after the dynamic apparatus becomes docked with a docking station, before or after being separated from the docking station, and operates.

The present invention also provides a method and apparatus for compensating for errors of the conversion factor in the case a low-priced dynamic apparatus is used, such as errors occurring due to changes in temperature, in the passage of time, or applying voltage, namely, errors of conversion factors, occurring or increasing when using a low-priced dynamic apparatus.

Technical Solutions

According to an aspect of the present invention, there is provided a method of controlling accuracy of a rotation angle of the rotary movement of a dynamic apparatus, including: the step of determining a conversion factor of a gyroscope installed in the dynamic apparatus to control the rotary movement to be a first conversion factor; a first step of measuring an output angular velocity in the case of applying a predetermined test operation to the gyroscope; a second step of measuring a second conversion factor based on the test operation and the output angular velocity corresponding to the test operation; a third step of computing an error between the first conversion factor and the second conversion factor; and a fourth step of updating the first conversion factor of the gyroscope by the second conversion factor in the case the error is more than a predetermined standard value, wherein in the case the dynamic apparatus is on standby or an operation command with respect to a predetermined operation is inputted, the first through fourth steps are performed before the operation is performed.

According to another aspect of the present invention, there is provided a method of controlling accuracy of a rotation angle of the rotary movement of a dynamic apparatus, including: the step of maintaining a first conversion factor table in association with a gyroscope installed in the dynamic apparatus, the first conversion factor table created according to an applied operation and an angular velocity corresponding to the applied operation; a first step of measuring an output angular velocity in the case of applying a predetermined test operation to the gyroscope; a second step of generating a second conversion factor table based on the test operation and the output angular velocity corresponding to the test operation; a third step of computing an error between a first conversion factor and a second conversion factor with reference to the first conversion factor table and the second conversion factor table; and a fourth step of updating the first conversion factor table with respect to the gyroscope by using the second conversion factor table in the case the error is more than a predetermined standard value, wherein in the case the dynamic apparatus is on standby or an operation command for a predetermined operation is inputted, the first through fourth steps are performed before the operation is performed.

According to still another aspect of the present invention, there is provided a method of controlling accuracy of a rotation angle of the rotary movement of a dynamic apparatus by using a docking station, including: the step of determining a conversion factor of a gyroscope installed in the dynamic apparatus to control the rotary movement to be a first conversion factor; the step of determining whether the dynamic apparatus is docked with a predetermined docking station, in which the docking station includes a charging unit for charging the dynamic apparatus; a first step of inputting a rotation command for rotating the dynamic apparatus by a certain angle based on the datum point of the docking station; a second step of measuring a rotation angle by which the dynamic apparatus is actually rotated according to the rotation command based on the datum point; a third step of computing an error between the certain angle and the measured rotation; a fourth step of computing a second conversion factor based on one of the first conversion factor and the certain angle in the case the error is more than a predetermined standard value; and a fifth step of updating the first conversion factor of the dynamic apparatus by the second conversion factor.

According to yet another aspect of the present invention, there is provided an apparatus for controlling accuracy of a rotation angle of the rotary movement of a dynamic apparatus, including: a conversion factor database including a first conversion factor table according to applied voltage and the angular velocity corresponding to the applied voltage and a second conversion factor table according to the test result of a conversion factor in association with a gyroscope installed in the dynamic apparatus; an angular velocity measuring unit measuring output angular velocity in the case a test voltage is applied to the gyroscope; a conversion factor error computing unit generating the second conversion factor table based on the test voltage, the output angular velocity corresponding to the test voltage, and computing an error between the first conversion factor and the second conversion factor with reference to the first conversion factor table and the second conversion factor table; and a conversion factor adjusting unit updating the first conversion factor table with respect to the gyroscope by using the second conversion factor table in the case the error is more than a predetermined standard value.

BEST MODE FOR CARRYING OUT THE INVENTION

Hereinafter, a method and apparatus for controlling the accuracy of a rotation angle of a rotation of a dynamic apparatus, according to the present invention, will be described in detail with reference to the attached drawings.

Figure 5:
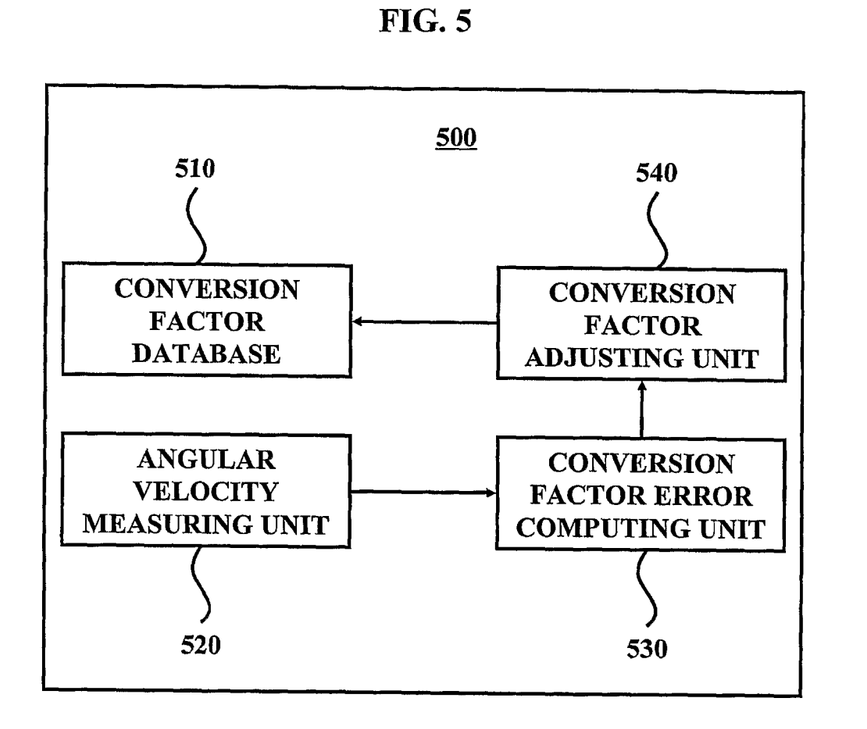
FIG. 5 is a diagram illustrating the configuration of an apparatus for controlling a rotation angle of a dynamic apparatus, according to an embodiment of the present invention.
Figure 6:
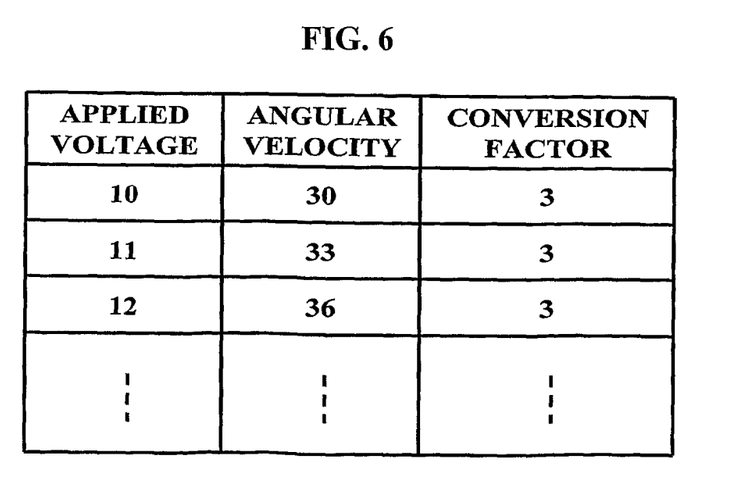
FIG. 6 is a diagram illustrating an example of a conversion factor table according to the present invention.

FIG. 5 is a diagram illustrating the configuration of an apparatus for controlling a rotation angle of a dynamic apparatus, according to an embodiment of the present invention, and FIG. 6 is a diagram illustrating an example of a conversion factor table according to the present invention. A control apparatus 500 may be installed in the dynamic apparatus. Also, according to embodiments, the control apparatus 500 may be installed outside the dynamic apparatus or installed in a docking station, as described later. The control apparatus 500 may control the dynamic apparatus in the case the dynamic apparatus is connected to the control apparatus 500.

Referring to FIGS. 5 and 6, the control apparatus 500 controlling the accuracy of the rotation angle of a rotation of a dynamic apparatus, according to an embodiment of the present invention, includes a conversion factor database 510, an angular velocity measuring unit 520, a conversion factor error computing unit 530, and a conversion factor adjusting unit 540.

The conversion factor database 510 includes a first conversion factor table according to applied voltage and the angular velocity corresponding to the applied voltage, and a second conversion factor table according to predetermined test voltages and angular velocities corresponding to the test voltage in association with a gyroscope installed in the dynamic apparatus. As illustrated in FIG. 6, the first or second conversion factor table indicates applied voltages, angular velocities corresponding to the applied voltages, and conversion factors according to the angular velocities. Also, though the angular velocities corresponding to the applied voltage are recorded in FIG. 6, only the applied voltage and the conversion factors are recorded in the conversion factor table, according to embodiments.

The control apparatus 500 adjusts the conversion factor of a gyroscope installed in the dynamic apparatus in the case a predetermined condition is satisfied. For example, the control apparatus 500 adjusts the conversion factor in the case the dynamic apparatus is on standby in which the dynamic apparatus does not perform an operation and is on standby for command. Also, according to the embodiments, the control apparatus 500 adjusts the conversion factor in the case the dynamic apparatus is on standby and before the dynamic apparatus performs a predetermined operation according to an inputted predetermined operation command.

To adjust the conversion factor, in the case the dynamic apparatus is on standby or an operation command for a predetermined operation is inputted, the angular velocity measuring unit 520 applies a test operation to the gyroscope and measures an output angular velocity which results from the dynamic apparatus performing a rotation operation according to the applied test operation. For example, the angular velocity measuring unit 520 periodically applies a test operation to the gyroscope and measures an output angular velocity corresponding to the applied test operation in the case the dynamic apparatus is on standby.

In the case the dynamic apparatus is docked with a predetermined docking station, the angular velocity measuring unit 520 applies the test operation to the gyroscope after the dynamic apparatus becomes docked with the docking station or before becoming separated from the docking station and measures the angular velocity outputted which results from the dynamic apparatus performing a rotation according to the applied test operation.

The conversion factor error computing unit 530 periodically generates the second conversion factor table based on the test operation and the output angular velocity measured corresponding to the test operation in the case the dynamic apparatus is on standby or before a predetermined operation is performed in the case a command with respect to the predetermined operation is inputted and computes an error between the first conversion factor and the second conversion factor with reference to the first and second conversion factor tables. The error between the first conversion factor and the second conversion factor may be computed from a difference between the first and second conversion factor by comparing the first conversion factor with the second conversion factor. Also, to compute the error between the first and second conversion factor, any desired error computing method may be used. For example, the ratio or difference between the first conversion factor and the second conversion factor may be used.

The conversion factor error computing unit 530, in the case the dynamic apparatus is on standby, periodically generates the second conversion factor table based on the test operation and the output angular velocity measured corresponding to the test operation and computes an error between the first conversion factor and the second conversion factor with reference to the first and second conversion factor table. The conversion factor error computing unit 530, in the case the dynamic apparatus is docked with a predetermined docking station, generates the second conversion factor table based on the test operation and the output angular velocity measured corresponding to the test operation after the dynamic apparatus becomes docked with the docking station or before the dynamic apparatus is separated from the docking station and computes an error between the first conversion factor and the second conversion factor with reference to the first and second conversion factor table.

The conversion factor adjusting unit 540, in the case the dynamic apparatus is on standby or before a predetermined operation is performed in the case a command with respect to the predetermined operation is inputted, updates the first conversion factor table with respect to the gyroscope by using the second conversion factor table in the case the computed error between the conversion factors is more than a predetermined standard value. The conversion factor adjusting unit 540, in the case the dynamic apparatus is on standby, periodically updates the first conversion factor table with respect to the gyroscope by using the second conversion factor table in the case the error computed by the conversion factor error computing unit 530 is more than a predetermined standard value. The conversion factor adjusting unit 540, in the case the dynamic apparatus is docked with a predetermined docking station, after the dynamic apparatus becomes docked with the docking station or before the dynamic apparatus is separated from the docking station, updates the first conversion factor table with respect to the gyroscope by using the second conversion factor table in the case the computed error is more than a predetermined standard value.

For example, as illustrated in FIG. 6, in the case a first conversion factor is 3, when a test operation of 10 V is applied, theoretically, an output angular velocity has to be 30 rad/sec. However, in case of a dynamic apparatus using a low-priced gyroscope, an actual angular velocity may be more or less than the theoretical angular velocity 30 rad/sec due to a bias error such as the change of internal resistance. In this case, if the actual angular velocity is measured to be 31 rad/sec, a second conversion factor that is an actual conversion factor is 3.1. If an error is computed by using a difference between the first conversion factor, which is set in a process of manufacturing the gyroscope or compensating an error, and the second conversion factor, the error of the conversion factors is computed as 0.1. In the case an error of conversion factor occurs, which is more than a predetermined standard value from which the dynamic apparatus begins performing an imprecise operation with respect to a rotation operation more than a certain degree, the first conversion factor table is updated by using the second conversion factor table.

As described above, since the accuracy of rotation angle with respect to rotation is decreased in the case the computed error of the conversion factor is more than a predetermined standard value, the dynamic apparatus can not precisely perform a relevant operation. Therefore, in the present invention, an existing conversion factor table is updated by using a conversion factor table computed by test in order to readjust a conversion factor in the case the error of the conversion factor of the rotation of a dynamic apparatus is more than a predetermined standard value. Accordingly, according to the present invention, since a conversion factor table is updated in the case the error of the conversion factor of rotation of a dynamic apparatus is more than a predetermined standard value, the dynamic apparatus may be controlled to precisely perform a rotation and a desirable rotation angle may be outputted, thereby precisely performing operations that a user wants.

Figure 7:
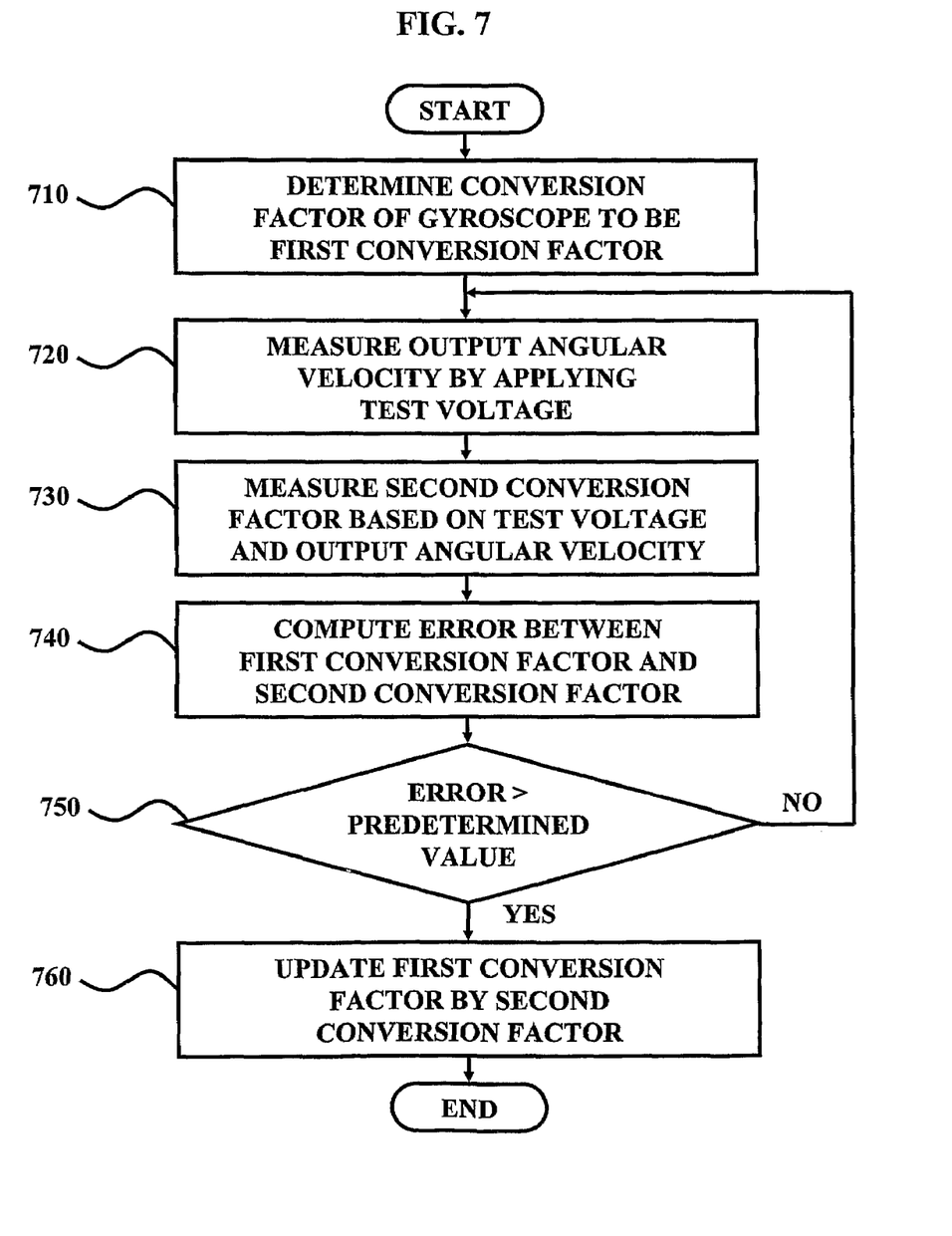
FIG. 7 is a flow chart illustrating a method of controlling the rotation angle of a dynamic apparatus, according to an embodiment of the present invention.

FIG. 7 is a flow chart illustrating a method of controlling the rotation angle of a dynamic apparatus, according to an embodiment of the present invention. The controlling method according to the present embodiment may be performed by the control apparatus 500 as shown in FIG. 5.

Referring to FIG. 7, in Step 710, the control apparatus 500 of a dynamic apparatus determines the conversion factor of a gyroscope installed in the dynamic apparatus to control the rotation to be a first conversion factor. The first conversion factor is a conversion factor set in the gyroscope installed in the dynamic apparatus and is a standard for comparing with other actual conversion factors according to the test of the dynamic apparatus. The first conversion factor may be a conversion factor determined while manufacturing the gyroscope or a conversion factor determined in a previous test, according to the present invention.

A test for readjusting a conversion factor according to the present embodiment may be performed in the case the dynamic apparatus is on standby. Also, in the case a predetermined operation command is inputted to the dynamic apparatus, the test may be performed before a predetermined operation is performed in order to precisely perform the operation command. Also, the test may be periodically performed. Hereinafter, a test process for adjusting the first conversion factor of the gyroscope will be described in detail.

In Step 720, an output angular velocity according to the test operation is measured by applying a predetermined test operation to the gyroscope.

In Step 730, a second conversion factor is measured based on the test operation and the output angular velocity corresponding to the test operation. The second conversion factor is the ratio between the test operation and the output angular velocity according to the test operation.

The control apparatus 500 of the dynamic apparatus computes an error between the first conversion factor and the second conversion factor (Step 740) and determines whether the computed error is more than a predetermined standard value (Step 750).

In the case the computed error is larger than the predetermined standard value, the control apparatus 500 updates the first conversion factor of the gyroscope by the second conversion factor. Namely, in the case the error between the first conversion factor determined while manufacturing or a previous test, and the second conversion factor determined by the current test is more than a predetermined standard value, the control apparatus 500 determines the first conversion factor is not precise due to a bias error according to the change in the property of an internal factor, such as the resistance of the gyroscope, and changes the first conversion factor into the second conversion factor in order to correct for the changed property. Accordingly, a desirable rotation angular velocity may be precisely outputted and a rotation angle of the rotation of the dynamic apparatus may be more precisely controlled.

Figure 8:
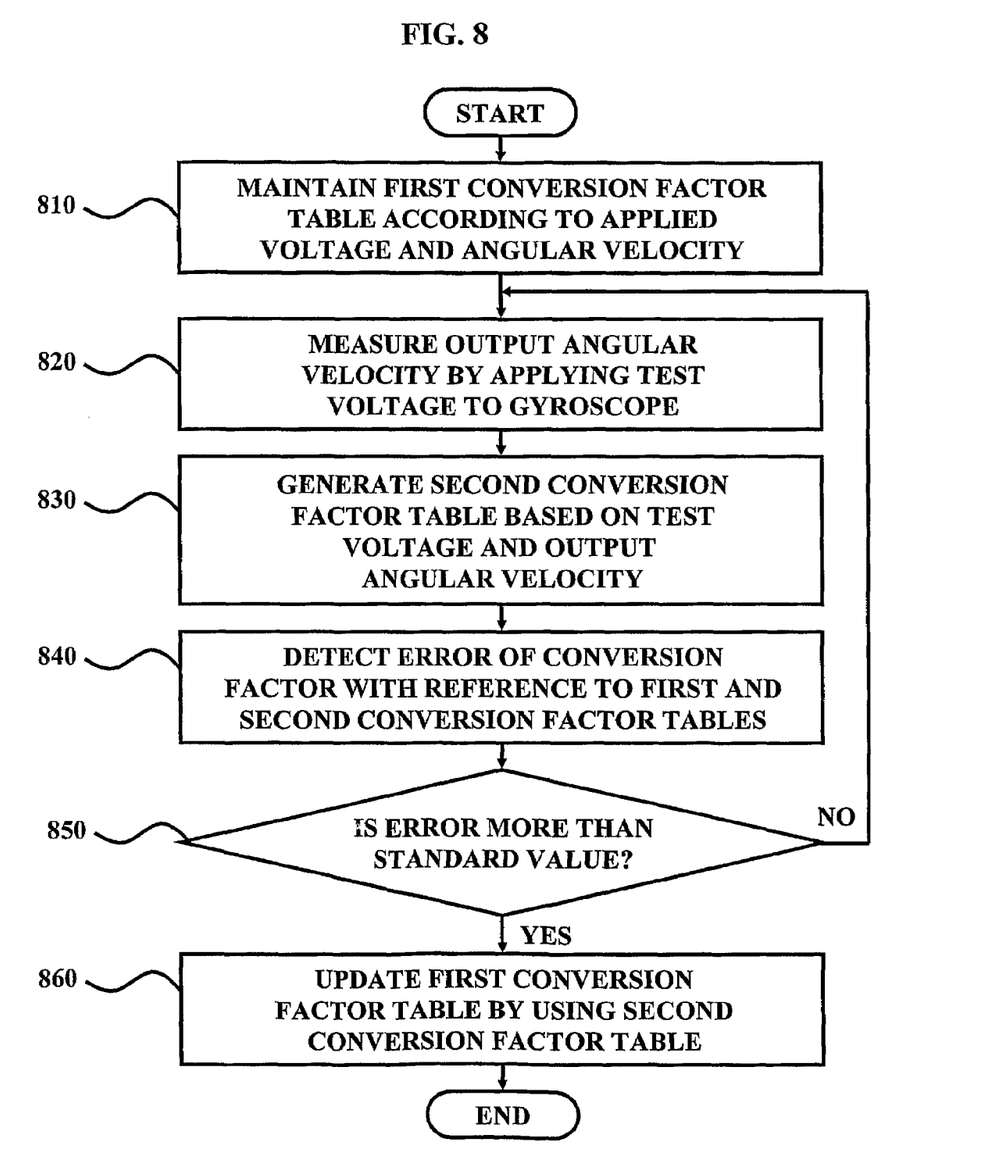
FIG. 8 is a flow chart illustrating a method of controlling the rotation angle of a dynamic apparatus, according to another embodiment of the present invention.

FIG. 8 is a flow chart illustrating a method of controlling the rotation angle of a dynamic apparatus, according to another embodiment of the present invention.

Referring to FIG. 8, in Step 810, the control apparatus 500 of the dynamic apparatus maintains a first conversion factor table according to an applied operation and an angular velocity corresponding to the applied operation in association with a gyroscope installed in the dynamic apparatus. In the first conversion factor table, applied operations, angular velocities corresponding to the applied operations, or conversion factors according to the applied operation and the angular velocities are matched with the associated gyroscope. Also, according to the embodiments, the first conversion factor table may include the applied operation and the conversion factor as one pair.

In Step 820, the control apparatus 500, in the case the dynamic apparatus is on standby or before a predetermined operation is performed in the case a command with respect to a predetermined operation is inputted, applies a test operation to the gyroscope and measures an output angular velocity corresponding to the test operation.

In Step 830, the control apparatus 500 generates the second conversion factor table based on the test operation and the output angular velocity corresponding to the test operation. In the second conversion factor table, the test operation and the conversion factor according to the output angular velocity corresponding to the test operation are matched.

The control apparatus 500 computes an error between the first conversion factor and the second conversion factor with reference to the first conversion factor table and the second conversion factor table (Step 840) and determines whether the computed error is more than a predetermined standard value (Step 850).

In the case the computed error is more than the predetermined standard value, in Step 860, the control apparatus 500 updates the first conversion factor table with respect to the gyroscope by using the second conversion factor table. On the other hand, the first conversion factor may be changed to be the second conversion factor only in the case the first conversion factor table is compared with the second conversion factor table and the error is more than the predetermined standard value. For example, the error is not more than the predetermined standard value in the case a test voltage is from 0 to 10[V], but the error is more than the predetermined standard value in the case a test voltage more than 10 [V]. In this case, the first conversion factor table may be updated only in the case the test voltage is greater than 10 [V].

In the case the dynamic apparatus is on standby, the control apparatus 500 may periodically perform Steps 820 through 860.

As described above, in the method of controlling the accuracy of a rotation angle of a rotation of a dynamic apparatus, according to another embodiment, an error of conversion factor is periodically computed and a conversion factor table is updated in the case the error is more than a predetermined standard value, thereby precisely controlling the rotation angle according to the rotation such that the dynamic apparatus may precisely perform the rotation.

Figure 9:
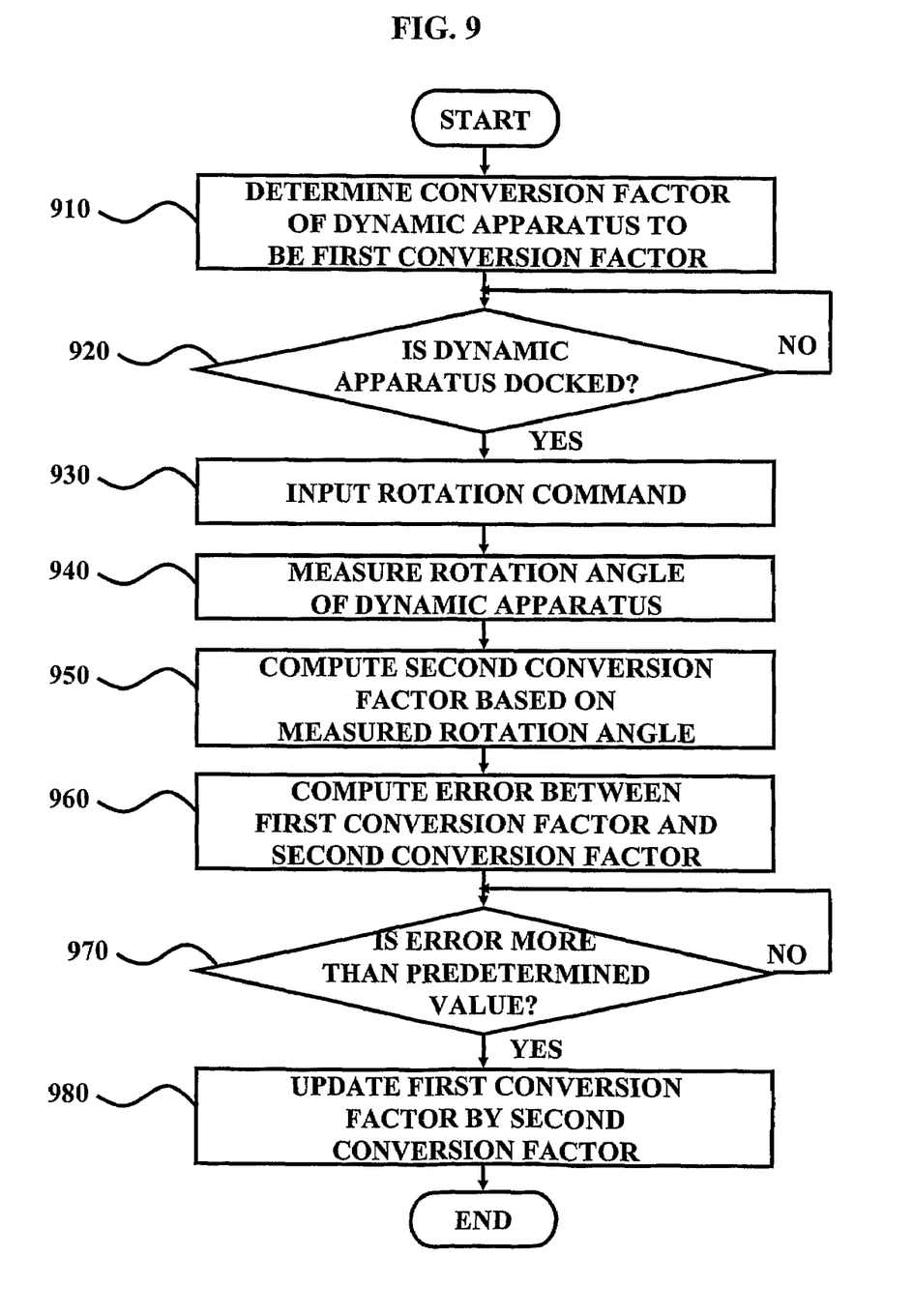
FIG. 9 is a flow chart illustrating a method of controlling the rotation angle of a dynamic apparatus, according to still another embodiment of the present invention.

FIG. 9 is a flow chart illustrating a method of controlling the rotation angle of a dynamic apparatus using a docking station, according to still another embodiment of the present invention.

Figure 10:
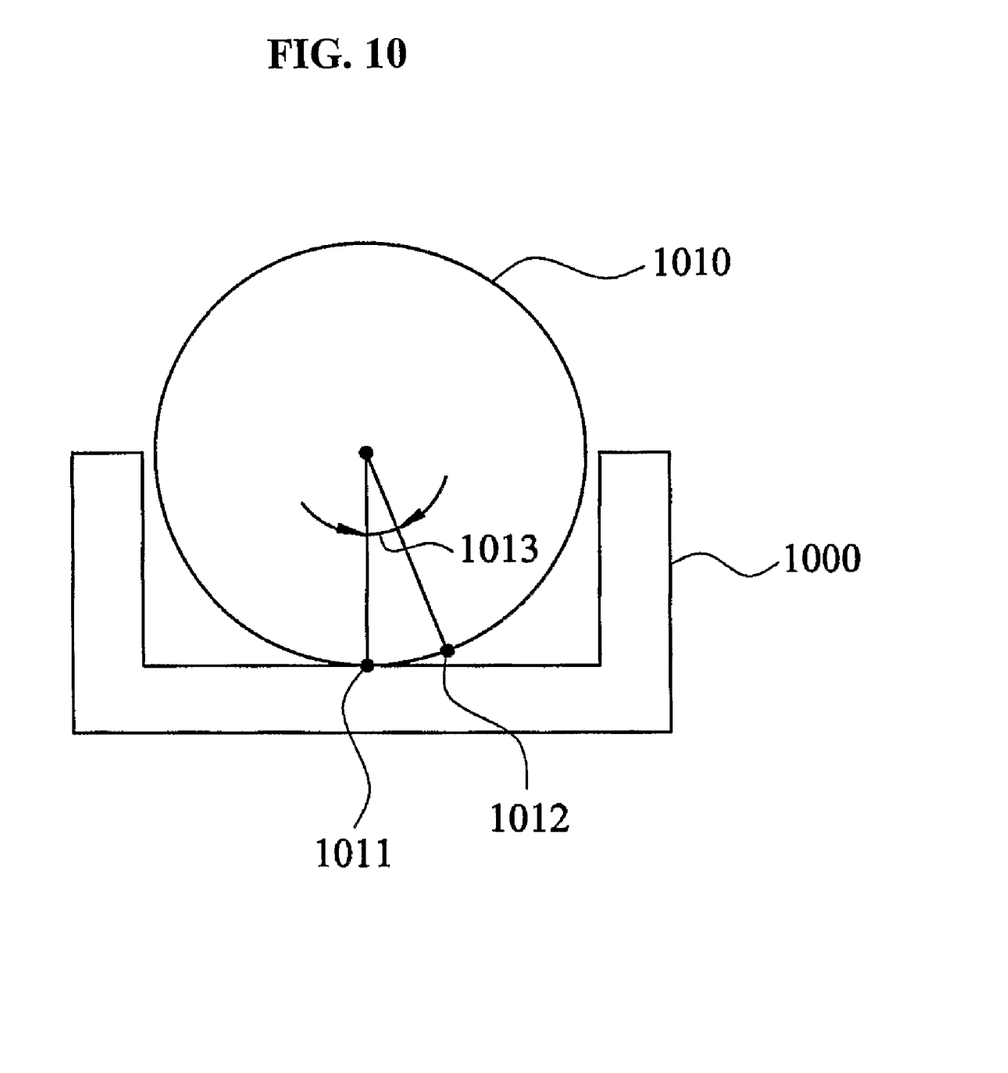
FIG. 10 is a diagram illustrating a state in which a dynamic apparatus is docked with a docking station, according to an embodiment of the present invention.

Referring to FIGS. 9 and 10, in Step 910, the control apparatus 500 of a dynamic apparatus 1010 determines a conversion factor of the dynamic apparatus 1010 to be a first conversion factor in order to control the rotation.

In Step 920, the control apparatus 500 of the dynamic apparatus 1010 determines whether the dynamic apparatus 1010 is docked with a docking station 1000. The docking station 1000 may be a storage container for the dynamic apparatus 1010 or charging equipment for charging the dynamic apparatus 1010 in the case the dynamic apparatus 1010 is on standby.

In the case the dynamic apparatus 1010 is docked with the docking station 1000, in Step 930, the control apparatus 500 generates a rotation command in order to rotate the dynamic apparatus 1010 by a certain angle. Also, the rotation command may be inputted from an external apparatus such the docking station 1000 via a connection unit (not shown) of the dynamic apparatus 1010.

In Step 940, the control apparatus 500 of the dynamic apparatus 1010 measures the rotation angle that the dynamic apparatus 1010 is actually rotated according to the rotation command, based on a predetermined reference line.

For example, as illustrated in FIG. 10, a reference line including a point 1011 of the docking station 1000 and the rotation center of the dynamic apparatus 1010 may be selected.

In the case the dynamic apparatus 1010 rotates according to the rotation command and stops, the dynamic apparatus 1010 may sense the rotation angle that the dynamic apparatus rotates based on the reference line by using a predetermined sensor in the case the position of the dynamic apparatus 1010 is 1012 after rotating from the point 1011.

In Step 950, the control apparatus 500 computes a second conversion factor based on the measured rotation angle. The second conversion factor is computed based on an operation voltage of the dynamic apparatus, the measured rotation angle, and rotation time.

In Step 960, the control apparatus 500 of the dynamic apparatus 1010 computes an error between the first conversion factor and the second conversion factor. The error between the first conversion factor and the second conversion factor may be computed by a predetermined method according to the embodiments, such as a difference between the first and second conversion factors or a ratio between the first and second conversion factors.

In Step 970, the control apparatus 500 of the dynamic apparatus 1010 determines whether the computed error is more than a predetermined standard value. In the case the error between the first and second conversion factors is more than a predetermined standard value in the dynamic apparatus 1010, the accuracy of rotation angle with respect to the dynamic apparatus 1010 is degraded to be less than a certain level, the rotation of the dynamic apparatus 1010 may be determined to be not precise.

In the case the computed error is more than the predetermined standard value, in Step 980, the control apparatus 500 of the dynamic apparatus 1010 updates the first conversion factor of the dynamic apparatus 1010 by the second conversion factor.

Also, according to still another embodiment of the present invention, the dynamic apparatus 1010 may compute an error of rotation by using a certain angle that the dynamic apparatus 1010 has to rotate according to the rotation command and an actual rotation angle that the dynamic apparatus actually rotates according to the rotation command. Namely, in the case the rotation command is for rotating the dynamic apparatus 1010 by 360°, the dynamic apparatus 1010 may compute an error 1013 between the point 1011 and the location 1012.

In the case of the dynamic apparatus 1010 according to the present embodiment, in the case the error 1013 of the rotation angle is more than a predetermined standard value, the second conversion factor that is the actual conversion factor of the dynamic apparatus is computed by using the error 1013 and the first conversion factor, and the first conversion factor of the dynamic apparatus is updated by the second conversion factor, thereby obtaining a more precise second conversion factor.

Also, according to yet another embodiment of the present invention, the control apparatus of the dynamic apparatus 1010 may perform Steps 930 through 980 before the dynamic apparatus 1010 is separated from the docking station 1000.

As described above, in the present invention, an error of conversion factor of a dynamic apparatus is compensated for after the dynamic apparatus becomes docked with a docking station or before the dynamic apparatus is separated from the docking station, thereby minimizing imprecise operations occurring when the dynamic apparatus performs rotation.

According to a further embodiment of the present invention, a rotation angle that a dynamic apparatus actually rotates according to a predetermined rotation command in a state in which the dynamic apparatus is not docked with a docking station may be measured. For this, a magnetometer or camera may be used in the dynamic apparatus.

A process of measuring the rotation angle by using a magnetometer will be described. A dynamic apparatus equipped with a magnetometer sensor may sense what direction a line including a point on the dynamic apparatus indicates from the rotation center of the dynamic apparatus, such as due north. The dynamic apparatus may determine one of the lines indicating the direction sensed before rotating according to rotation command and including the rotation center, to be a reference line.

Also, a dynamic apparatus may actually rotate the magnetometer according to the rotation command, may sense that a line including the rotation center and point on the dynamic apparatus indicates a new direction, and may measure a rotation angle that the dynamic apparatus rotates based on the reference line by using the newly sensed direction. In this case, the dynamic apparatus may identify the direction of the reference line by using the magnetometer.

On the other hand, though the magnetometer may not sense the absolute coordinates of a predetermined direction due to the distortion of the magnetic field of the earth, the magnetometer sensor may sense how much the dynamic apparatus rotates, thereby still obtaining the original objective of measuring the size of the rotation angle of the dynamic apparatus.

Also, a process of measuring the rotation angle by using a camera will be described. The dynamic apparatus according to the present embodiment includes a camera and measures the rotation angle by using an image signal inputted from the camera.

In the position the dynamic apparatus stops, the dynamic apparatus selects a point that an image signal with respect to a predetermined still image is inputted from the camera. For example, a point on a frame of an image photographed by a camera may be selected. In this case, a line connecting the rotation center of the dynamic apparatus to the point may be used as a reference line for measuring the rotation angle.

After rotating according to the rotation command and on standby, the dynamic apparatus receives a predetermined image signal from the camera. Also, while receiving the image signal, the dynamic apparatus additionally rotates in the same direction of the rotation direction according to the rotation command until an image signal identical with the image signal with respect to the still image is inputted, namely, a return to the original position.

The dynamic apparatus may measure the angle that the dynamic apparatus actually rotates according to the rotation angle by measuring the degree of angle of additional rotation.

Namely, the accuracy of the rotation of the dynamic apparatus may be measured by measuring the rotation angle that the dynamic apparatus actually rotates according to the rotation command of rotating the dynamic apparatus by a certain angle. In the case an error between the certain angle and the rotation angle is more than a predetermined standard value or an error between the first conversion factor that exists and the second conversion factor that is obtained by the rotation angle of the dynamic apparatus is more than the predetermined standard value, the conversion factor of the dynamic apparatus is updated, thereby ensuring the accuracy of the rotation of the dynamic apparatus.

Also, in the case the rotation angle is measured by using a magnetometer or a camera, since the accuracy of the rotation of the dynamic apparatus may be regularly or irregularly adjusted in a state in which the dynamic apparatus is not docked with a docking station, it is not required that the dynamic apparatus has to return to the docking station in order to adjust the accuracy of the rotation.

Also, the embodiments of the present invention include a computer readable medium including a program instruction for executing various operations realized by a computer. The computer readable medium may include a program instruction, a data file, and a data structure, separately or cooperatively. The program instructions and the media may be those specially designed and constructed for the purposes of the present invention, or they may be of the kind well known and available to those skilled in the art of computer software arts. Examples of the computer readable media include magnetic media (e.g., hard disks, floppy disks, and magnetic tapes), optical media (e.g., CD-ROMs or DVD), magneto-optical media (e.g., floptical disks), and hardware devices (e.g., ROMs, RAMs, or flash memories, etc.) that are specially configured to store and perform program instructions. The media may also be transmission media such as optical or metallic lines, wave guides, etc. including a carrier wave transmitting signals specifying the program instructions, data structures, etc. Examples of the program instructions include both machine code, such as produced by a compiler, and files containing high-level languages codes that may be executed by the computer using an interpreter.

INDUSTRIAL APPLICABILITY

According to the present invention, a method and apparatus for controlling the accuracy of the rotation angle of a rotation of a dynamic apparatus is provided to minimize imprecise operations of the dynamic apparatus.

Also, according to the present invention, a conversion factor of a rotation of a dynamic apparatus is tested, and the conversion factor is updated in the case the conversion factor is more than a predetermined standard value.

Also, according to the present invention, a method and apparatus for periodically computing an error of a conversion factor in a state in which a dynamic apparatus performing rotation is on standby and updating the conversion factor the case the error is more than a predetermined standard value are provided, thereby more precisely performing the rotation.

Also, according to the present invention, after a dynamic apparatus becomes docked with a docking station or before separated from the docking station, an error of the conversion factor of a gyroscope installed in the dynamic apparatus is compensated for, thereby improving the accuracy of the rotation angle in the case the dynamic apparatus performs rotation.

Also, according to the present invention, the error of a conversion factor, which occurs due to a change caused by temperature, time, and applying voltage, is compensated for online, thereby performing more precise operations.

While this invention has been particularly shown and described with reference to preferred embodiments thereof, various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

The invention claimed is:

1. A method of controlling precision of a rotation angle of the rotary movement of a dynamic apparatus, comprising:
a step of determining a conversion factor of a gyroscope installed in the dynamic apparatus to control the rotary movement to be a first conversion factor;
a first step of measuring an output angular velocity in the case of applying a predetermined test operation to the gyroscope;
a second step of measuring a second conversion factor based on the test operation and the output angular velocity corresponding to the test operation;
a third step of computing an error between the first conversion factor and the second conversion factor; and
a fourth step of updating the first conversion factor of the gyroscope by the second conversion factor in the case the error is more than a predetermined standard value,
wherein in the case the dynamic apparatus in on standby or an operation command with respect to a predetermined operation is inputted, the first through fourth steps are performed before the operation is performed.

2. The method of claim 1, wherein in the case the dynamic apparatus is on standby, the first through fourth steps are periodically performed.

3. A method of controlling precision of a rotation angle of the rotary movement of a dynamic apparatus, comprising:
a step of maintaining a first conversion factor table in association with a gyroscope installed in the dynamic apparatus, the first conversion factor table is according to an applied operation and an angular velocity corresponding to the applied operation;

a first step of measuring an output angular velocity in the case of applying a predetermined test operation to the gyroscope;

a second step of generating a second conversion factor table based on the test operation and the output angular velocity corresponding to the test operation;

a third step of computing an error between a first conversion factor and a second conversion factor with reference to the first conversion factor table and the second conversion factor table; and a fourth step of updating the first conversion factor table with respect to the gyroscope by using the second conversion factor table in the case the error is more than a predetermined standard value, wherein in the case the dynamic apparatus in on standby or an operation command for a predetermined operation is inputted, the first through fourth steps are performed before the operation is performed.

4. The method of claim 3, wherein in the case the dynamic apparatus is on standby, the first through fourth steps are periodically performed.

5. A method of controlling precision of a rotation angle of the rotary movement of a dynamic apparatus by using a docking station, comprising:

a step of determining a conversion factor of a gyroscope installed in the dynamic apparatus to control the rotary movement to be a first conversion factor;

a first step of generation a rotation command for rotating the dynamic apparatus by a certain angle based on the first conversion factor;

a second step of measuring a rotation angle that the dynamic apparatus is actually rotated by using a predetermined reference line including a rotation center of the dynamic apparatus;

a third step of computing a second conversion factor based on an error between the certain angle and the measured rotation angle;

a fourth step of computing an error between the first conversion factor and the second conversion factor; and a fifth step of updating the first conversion factor by the second conversion factor in the case the error is more than a predetermined standard value.

6. The method of claim 5, wherein the second step comprises the steps of:

determining whether the dynamic apparatus is docked with a predetermined docking station, in which the docking station includes a charging unit for charging the dynamic apparatus;

selecting a line including a point of the docking station from the rotation center of the dynamic apparatus to be the reference line in the case the dynamic apparatus is docked with the docking station;

identifying the reference line by using the point of the docking station after the dynamic apparatus is rotated according to the rotation command; and measuring the angle by which the dynamic apparatus is actually rotated based on the identified reference line.

7. The method of claim 6, wherein the first through fifth steps are performed before the dynamic apparatus is separated from the docking station.

8. The method of claim 5, wherein the dynamic apparatus further comprises a magnetometer sensor and the second step comprises the steps of:

selecting a predetermined direction from the rotation center of the dynamic apparatus to be the reference line by using the magnetometer sensor;

identifying the reference line after the dynamic apparatus is rotated according to the rotation command by using the magnetometer for sensing the direction; and measuring the rotation angle that the dynamic apparatus is actually rotated, based on the identified reference line.

9. The method of claim 5, wherein the dynamic apparatus further comprises a camera and the second step comprises the steps of:

selecting a point of an image signal with respect to a predetermined static image from the image signal inputted to the camera;

selecting a line including the point from the rotation center of the dynamic apparatus to be the reference line;

receiving an image signal from the camera in the case the dynamic apparatus is rotated according to the rotation command;

additionally rotating the dynamic apparatus in the same direction of the rotation direction according to the rotation command until the image signal with respect to the static image is inputted to the camera; and measuring the rotation angle that the dynamic apparatus is actually rotated according to the rotation command by using the additionally rotated rotation angle.

10. A method of controlling precision of a rotation angle of the rotary movement of a dynamic apparatus by using a docking station, comprising the step of:

determining a conversion factor of a gyroscope installed in the dynamic apparatus to control the rotary movement to be a first conversion factor;

determining whether the dynamic apparatus is docked with a predetermined docking station, in which the docking station includes a charging unit for charging the dynamic apparatus;

inputting a rotation command for rotating the dynamic apparatus by a certain angle based on the datum point of the docking station;

measuring a rotation angle by which the dynamic apparatus is actually rotated according to the rotation command based on the datum point;

computing an error between the certain angle and the measured rotation;

computing a second conversion factor based on one of the first conversion factor and the certain angle in the case the error is more than a predetermined standard value; and updating the first conversion factor of the dynamic apparatus by the second conversion factor.

11. A computer readable recording medium in which a program for executing the method according to claim 1 in a computer is recorded.

12. An apparatus for controlling precision of a rotation angle of the rotary movement of a dynamic apparatus, comprising:

a conversion factor database including a first conversion factor table according to applied voltage and angular velocity corresponding to the applied voltage, and a association with a gyroscope installed in the dynamic apparatus;

an angular velocity measuring unit measuring output angular velocity in the case a test voltage is applied to the gyroscope;

a conversion factor error computing unit generating the second conversion factor table based on the test voltage and the output angular velocity corresponding to the test voltage and computing an error between the first conversion factor and the second conversion factor with reference to the first conversion factor table and the second conversion factor table; and a conversion factor adjusting unit updating the first conversion factor table with respect to the gyroscope by using the second conversion factor table in the case the error is more than a predetermined standard value.

13. The apparatus of claim 12, wherein any one of the angular velocity measuring unit, the conversion factor error computing unit, and the conversion factor adjusting unit performs the operation after the dynamic apparatus becomes docked with a predetermined docking station or before the dynamic apparatus is separated from the docking station in the case the dynamic apparatus is an apparatus that is docked with the docking station.

* * * * *

UNITED STATES PATENT AND TRADEMARK OFFICE
CERTIFICATE OF CORRECTION

PATENT NO. : 7,433,795 B2
APPLICATION NO. : 11/664539
DATED : October 7, 2008
INVENTOR(S) : Hakyoung Chung and Jinwoo Song It is certified that error appears in the above-identified patent and that said Letters Patent is hereby corrected as shown below:

Claim 1, Column 12, Line 38;

Please delete "precision,"

and replace with

-- accuracy, --

Claim 3, Column 12, Line 61;

Please delete "precision,"

and replace with

-- accuracy, --

Claim 5, Column 13, Line 23;

Please delete "precision,"

and replace with

-- accuracy, --

UNITED STATES PATENT AND TRADEMARK OFFICE
CERTIFICATE OF CORRECTION

PATENT NO. : 7,433,795 B2
APPLICATION NO. : 11/664539
DATED : October 7, 2008
INVENTOR(S) : Hakyoung Chung and Jinwoo Song It is certified that error appears in the above-identified patent and that said Letters Patent is hereby corrected as shown below:

Claim 10, Column 14, Line 24;

Please delete "precision,"

and replace with

-- accuracy, --

Claim 12, Column 14, Line 51;

Please delete "precision,"

and replace with

-- accuracy, --

Signed and Sealed this

Nineteenth Day of May, 2009

JOHN DOLL
*Acting Director of the United States Patent and Trademark Office*